United States Patent
Ayub et al.

(10) Patent No.: US 11,150,907 B2
(45) Date of Patent: *Oct. 19, 2021

(54) PARALLEL SLICE PROCESSOR HAVING A RECIRCULATING LOAD-STORE QUEUE FOR FAST DEALLOCATION OF ISSUE QUEUE ENTRIES

(71) Applicant: INTERNATIONAL BUSINESS MACHINES CORPORATION, Armonk, NY (US)

(72) Inventors: Salma Ayub, Austin, TX (US); Sundeep Chadha, Austin, TX (US); Robert Allen Cordes, Austin, TX (US); David Allen Hrusecky, Cedar Park, TX (US); Hung Qui Le, Austin, TX (US); Dung Quoc Nguyen, Austin, TX (US); Brian William Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 16/049,038

(22) Filed: Jul. 30, 2018

(65) Prior Publication Data

US 2018/0336036 A1    Nov. 22, 2018

Related U.S. Application Data

(63) Continuation of application No. 14/595,635, filed on Jan. 13, 2015, now Pat. No. 10,133,576.

(51) Int. Cl.
*G06F 9/38* (2018.01)
*G06F 9/30* (2018.01)
*G06F 12/0875* (2016.01)

(52) U.S. Cl.
CPC ........ *G06F 9/3802* (2013.01); *G06F 9/30043* (2013.01); *G06F 9/30145* (2013.01);
(Continued)

(58) Field of Classification Search
CPC .................................................... G06F 9/3802
See application file for complete search history.

(56) References Cited

U.S. PATENT DOCUMENTS

| | | |
|---|---|---|
| 4,858,113 A | 8/1989 | Saccardi |
| 5,055,999 A | 10/1991 | Frank et al. |

(Continued)

FOREIGN PATENT DOCUMENTS

| | | |
|---|---|---|
| CN | 101021778 A | 8/2007 |
| CN | 101676865 A | 3/2010 |

(Continued)

OTHER PUBLICATIONS

Partial Translation of Office Action for JP Application 2017-530696 Teruyama, "Instruction window buffers with issued instruction buffers," Toshiba technology bulletin, pp. 25-28, vol. 20(14), published No. 2002-0600, Toshiba Corp., Mar. 18, 2002.

(Continued)

*Primary Examiner* — Michael Sun
(74) *Attorney, Agent, or Firm* — Nathan M. Rau

(57) ABSTRACT

An execution unit circuit for use in a processor core provides efficient use of area and energy by reducing the per-entry storage requirement of a load-store unit issue queue. The execution unit circuit includes a recirculation queue that stores the effective address of the load and store operations and the values to be stored by the store operations. A queue control logic controls the recirculation queue and issue queue so that that after the effective address of a load or store operation has been computed, the effective address of the load operation or the store operation is written to the (Continued)

recirculation queue and the operation is removed from the issue queue, so that address operands and other values that were in the issue queue entry no longer require storage. When a load or store operation is rejected by the cache unit, it is subsequently reissued from the recirculation queue.

19 Claims, 6 Drawing Sheets

(52) U.S. Cl.
CPC .......... *G06F 9/3836* (2013.01); *G06F 9/3885* (2013.01); *G06F 12/0875* (2013.01); *G06F 2212/1021* (2013.01); *G06F 2212/452* (2013.01); *G06F 2212/608* (2013.01)

(56) References Cited

U.S. PATENT DOCUMENTS

| | | | |
|---|---|---|---|
| 5,095,424 | A | 3/1992 | Woffinden et al. |
| 5,471,593 | A | 11/1995 | Branigin |
| 5,475,856 | A | 12/1995 | Kogge |
| 5,553,305 | A | 9/1996 | Gregor et al. |
| 5,630,139 | A | 5/1997 | Ozaki |
| 5,630,149 | A | 5/1997 | Bluhm |
| 5,680,597 | A | 10/1997 | Kumar et al. |
| 5,822,602 | A | 10/1998 | Thusoo |
| 5,996,068 | A | 11/1999 | Dwyer, III et al. |
| 6,026,478 | A | 2/2000 | Dowling |
| 6,044,448 | A | 3/2000 | Agrawal et al. |
| 6,073,215 | A | 6/2000 | Snyder |
| 6,073,231 | A | 6/2000 | Bluhm et al. |
| 6,092,175 | A | 7/2000 | Levy et al. |
| 6,112,019 | A | 8/2000 | Chamdani et al. |
| 6,119,203 | A | 9/2000 | Snyder et al. |
| 6,138,230 | A | 10/2000 | Hervin et al. |
| 6,145,054 | A | 11/2000 | Mehrotra et al. |
| 6,170,051 | B1 | 1/2001 | Dowling |
| 6,212,544 | B1 | 4/2001 | Borkenhagen et al. |
| 6,237,081 | B1 | 5/2001 | Le et al. |
| 6,286,027 | B1 | 9/2001 | Dwyer, III et al. |
| 6,311,261 | B1 | 10/2001 | Chamdani et al. |
| 6,336,183 | B1 | 1/2002 | Le et al. |
| 6,356,918 | B1 | 3/2002 | Chuang et al. |
| 6,381,676 | B2 | 4/2002 | Aglietti et al. |
| 6,425,073 | B2 | 7/2002 | Roussel et al. |
| 6,463,524 | B1 | 10/2002 | Delaney et al. |
| 6,487,578 | B2 | 11/2002 | Ranganathan |
| 6,498,051 | B1 | 12/2002 | Watanabe |
| 6,549,930 | B1 | 4/2003 | Chrysos et al. |
| 6,564,315 | B1 | 5/2003 | Keller et al. |
| 6,725,358 | B1 * | 4/2004 | Moore .................. G06F 9/3004 712/216 |
| 6,728,866 | B1 | 4/2004 | Kahle et al. |
| 6,732,236 | B2 | 5/2004 | Favor |
| 6,839,828 | B2 | 1/2005 | Gschwind et al. |
| 6,868,491 | B1 * | 3/2005 | Moore .................. G06F 9/3017 712/216 |
| 6,883,107 | B2 | 4/2005 | Rodgers et al. |
| 6,944,744 | B2 | 9/2005 | Ahmed et al. |
| 6,948,051 | B2 | 9/2005 | Rivers et al. |
| 6,954,846 | B2 | 10/2005 | Leibholz et al. |
| 6,978,459 | B1 | 12/2005 | Dennis et al. |
| 7,020,763 | B2 | 3/2006 | Saulsbury et al. |
| 7,024,543 | B2 | 4/2006 | Grisenthwaite et al. |
| 7,086,053 | B2 | 8/2006 | Long et al. |
| 7,093,105 | B2 | 8/2006 | Webb, Jr. et al. |
| 7,100,028 | B2 | 8/2006 | McGrath et al. |
| 7,114,163 | B2 | 9/2006 | Hardin et al. |
| 7,124,160 | B2 | 10/2006 | Saulsbury et al. |
| 7,155,600 | B2 | 12/2006 | Burky et al. |
| 7,191,320 | B2 | 3/2007 | Hooker et al. |
| 7,263,624 | B2 | 8/2007 | Marchand et al. |
| 7,290,261 | B2 | 10/2007 | Burky et al. |
| 7,302,527 | B2 | 11/2007 | Barrick et al. |
| 7,386,704 | B2 | 6/2008 | Schulz et al. |
| 7,395,419 | B1 | 7/2008 | Gonion |
| 7,398,374 | B2 | 7/2008 | DeLano |
| 7,469,318 | B2 | 12/2008 | Chung et al. |
| 7,478,198 | B2 | 1/2009 | Latorre et al. |
| 7,478,225 | B1 | 1/2009 | Brooks et al. |
| 7,490,220 | B2 | 2/2009 | Balasubramonian et al. |
| 7,512,724 | B1 | 3/2009 | Dennis et al. |
| 7,565,652 | B2 | 7/2009 | Janssen et al. |
| 7,600,096 | B2 | 10/2009 | Parthasarathy et al. |
| 7,656,013 | B2 | 2/2010 | Horiuchi |
| 7,669,035 | B2 | 2/2010 | Young et al. |
| 7,669,036 | B2 | 2/2010 | Brown et al. |
| 7,694,112 | B2 | 4/2010 | Barowski et al. |
| 7,707,390 | B2 | 4/2010 | Ozer et al. |
| 7,721,069 | B2 | 5/2010 | Ramchandran et al. |
| 7,793,278 | B2 | 9/2010 | Du et al. |
| 7,836,317 | B2 | 11/2010 | Marchand et al. |
| 7,865,769 | B2 | 1/2011 | Luick |
| 7,889,204 | B2 | 2/2011 | Hansen et al. |
| 7,890,735 | B2 | 2/2011 | Tran |
| 7,926,023 | B2 | 4/2011 | Okawa et al. |
| 7,975,134 | B2 | 7/2011 | Gonion |
| 7,979,677 | B2 | 7/2011 | Nguyen |
| 7,987,344 | B2 | 7/2011 | Hansen et al. |
| 8,028,152 | B2 | 9/2011 | Glew |
| 8,041,928 | B2 | 10/2011 | Burky et al. |
| 8,046,566 | B2 | 10/2011 | Abernathy et al. |
| 8,074,224 | B1 | 12/2011 | Nordquist et al. |
| 8,078,833 | B2 | 12/2011 | Wang et al. |
| 8,099,556 | B2 | 1/2012 | Ghosh et al. |
| 8,103,852 | B2 | 1/2012 | Bishop et al. |
| 8,108,656 | B2 | 1/2012 | Katragadda et al. |
| 8,135,942 | B2 | 3/2012 | Abernathy et al. |
| 8,140,832 | B2 | 3/2012 | Mejdrich et al. |
| 8,141,088 | B2 | 3/2012 | Morishita et al. |
| 8,166,282 | B2 | 4/2012 | Madriles et al. |
| 8,219,783 | B2 | 7/2012 | Hara |
| 8,250,341 | B2 | 8/2012 | Schulz et al. |
| 8,335,892 | B1 | 12/2012 | Minkin et al. |
| 8,386,751 | B2 | 2/2013 | Ramchandran et al. |
| 8,412,914 | B2 | 4/2013 | Gonion |
| 8,464,024 | B2 | 6/2013 | Makphaibulchoke |
| 8,464,025 | B2 | 6/2013 | Yamaguchi et al. |
| 8,489,791 | B2 | 7/2013 | Byrne et al. |
| 8,555,039 | B2 | 10/2013 | Rychlik |
| 8,578,140 | B2 | 11/2013 | Yokoi |
| 8,656,401 | B2 | 2/2014 | Venkataramanan et al. |
| 8,683,182 | B2 | 3/2014 | Hansen et al. |
| 8,700,877 | B2 | 4/2014 | Shebanow et al. |
| 8,713,263 | B2 | 4/2014 | Bryant |
| 8,732,438 | B2 | 5/2014 | Caprioli et al. |
| 8,850,121 | B1 | 9/2014 | Ashcraft et al. |
| 8,949,572 | B2 | 2/2015 | Kurosawa et al. |
| 8,966,232 | B2 | 2/2015 | Tran |
| 8,984,264 | B2 | 3/2015 | Karlsson et al. |
| 9,207,995 | B2 | 12/2015 | Boersma et al. |
| 9,223,709 | B1 | 12/2015 | O'Bleness et al. |
| 9,250,899 | B2 | 2/2016 | Gschwind |
| 9,262,174 | B2 | 2/2016 | Fetterman et al. |
| 9,323,739 | B2 | 4/2016 | Nicholson et al. |
| 9,417,879 | B2 | 8/2016 | Wilkerson |
| 9,424,045 | B2 | 8/2016 | Airaud et al. |
| 9,448,936 | B2 * | 9/2016 | Goel .................. G06F 12/0891 |
| 9,519,484 | B1 | 12/2016 | Stark |
| 9,639,369 | B2 | 5/2017 | Blasco |
| 9,665,372 | B2 | 5/2017 | Eisen et al. |
| 9,672,043 | B2 | 6/2017 | Eisen et al. |
| 9,690,585 | B2 | 6/2017 | Eisen et al. |
| 9,690,586 | B2 | 6/2017 | Eisen et al. |
| 9,720,696 | B2 | 8/2017 | Chu et al. |
| 9,740,486 | B2 | 8/2017 | Boersma et al. |
| 9,760,375 | B2 | 9/2017 | Boersma et al. |
| 9,817,667 | B2 | 11/2017 | Spadini |
| 9,842,005 | B2 | 12/2017 | Abdallah |
| 9,870,229 | B2 | 1/2018 | Chu et al. |
| 9,971,602 | B2 | 5/2018 | Eisen et al. |
| 9,977,678 | B2 | 5/2018 | Eisen et al. |

(56) References Cited

U.S. PATENT DOCUMENTS

| | | | |
|---|---|---|---|
| 10,419,366 B1* | 9/2019 | Kim | H03M 13/096 |
| 2002/0194251 A1 | 12/2002 | Richter et al. | |
| 2003/0120882 A1 | 6/2003 | Granston et al. | |
| 2004/0111594 A1 | 6/2004 | Feiste et al. | |
| 2004/0162966 A1* | 8/2004 | James Webb, Jr. ... | G06F 9/3814 712/214 |
| 2004/0216101 A1 | 10/2004 | Burky et al. | |
| 2005/0138290 A1 | 6/2005 | Hammarlund et al. | |
| 2006/0095710 A1 | 5/2006 | Pires Dos Reis Moreira et al. | |
| 2007/0022277 A1 | 1/2007 | Iwamura et al. | |
| 2007/0226470 A1* | 9/2007 | Krimer | G06F 9/3017 712/225 |
| 2009/0113182 A1 | 4/2009 | Abernathy et al. | |
| 2009/0172370 A1 | 7/2009 | Butler | |
| 2009/0198981 A1* | 8/2009 | Levitan | G06F 9/3806 712/238 |
| 2009/0265514 A1* | 10/2009 | Biles | G06F 12/127 711/154 |
| 2011/0161616 A1 | 6/2011 | Tarjan et al. | |
| 2012/0278590 A1 | 11/2012 | Lin | |
| 2013/0028332 A1 | 1/2013 | Le Leannec | |
| 2013/0054939 A1 | 2/2013 | Felch | |
| 2016/0103715 A1 | 4/2016 | Sethia et al. | |
| 2016/0117174 A1* | 4/2016 | Chadha | G06F 9/3838 712/206 |
| 2016/0202986 A1 | 7/2016 | Ayub et al. | |
| 2016/0202988 A1 | 7/2016 | Ayub et al. | |
| 2016/0202990 A1 | 7/2016 | Brownscheidle et al. | |
| 2016/0202992 A1 | 7/2016 | Brownscheidle et al. | |
| 2017/0168837 A1 | 6/2017 | Eisen et al. | |
| 2018/0067746 A1 | 3/2018 | Chu et al. | |
| 2018/0150300 A1 | 5/2018 | Eisen et al. | |
| 2018/0150395 A1* | 5/2018 | Cordes | G06F 12/0897 |

FOREIGN PATENT DOCUMENTS

| | | |
|---|---|---|
| CN | 101876892 A | 11/2010 |
| CN | 102004719 A | 4/2011 |
| CN | 102122275 A | 7/2011 |
| GB | 2493209 B | 2/2016 |
| JP | H0374721 A | 3/1991 |
| JP | H11252179 A | 9/1999 |
| JP | 2006114036 A | 4/2006 |
| JP | 2007172610 A | 7/2007 |
| JP | 2009009570 A | 1/2009 |
| JP | 2011522317 A | 7/2011 |
| JP | 2013521557 A5 | 8/2015 |
| WO | 2011082690 A1 | 7/2011 |

OTHER PUBLICATIONS

Chu et al., "Independent Mapping of Threads," U.S. Appl. No. 16/676,763, filed Nov. 7, 2019.

List of IBM Patents or Patent Applications Treated as Related, Signed Nov. 7, 2019, 2 pages.

U.S. Appl. No. 16/048,946, filed Jul. 30, 2018, Brownsheidle, et al.

U.S. Appl. No. 16/001,333, filed Jun. 6, 2018, Eisen, et al.

List of IBM Patents or Patent Applications Treated as Related, 4 pages.

Office Action in U.S. Appl. No. 14/595,635 dated Jan. 4, 2017, 33 pages (pp. 1-33 in pdf).

Final Office Action in U.S. Appl. No. 14/595,635 dated May 17, 2017, 22 pages (pp. 1-22 in pdf).

Office Action in U.S. Appl. No. 14/595,635 dated Dec. 27, 2017, 16 pages (pp. 1-16 in pdf).

Notice of Allowance in U.S. Appl. No. 14/595,635 dated Jul. 9, 2018, 8 pages (pp. 1-8 in pdf).

Office Action in U.S. Appl. No. 14/724,268 dated Dec. 15, 2016, 27 pages (pp. 1-27 in pdf).

Final Office Action in U.S. Appl. No. 14/724,268 dated May 31, 2017, 19 pages (pp. 1-19 in pdf).

Gebhart et al., "A Hierarchical Thread Scheduler and Register File for Energy-Efficient Throughput Processors", ACM Transactions on Computer Systems, Apr. 2012, pp. 8:1-8:38, (38 pages in pdf),vol. 30, No. 2, Article 8, ACM.

"Method and system for Implementing "Register Threads" in a Simultaneously-Multithreaded (SMT) Processor Core", An IP.com Prior Art Database Technical Disclosure, Authors et. al.: Disclosed Anonymously, IP.com No. IPCOM000199825D, IP.com Electronic Publication: Sep. 17, 2010, pp. 1-4, <http://ip.com/IPCOM/000199825>.

Pechanek, et al., "ManArray Processor Interconnection Network: An Introduction", Euro-Par' 99 Parallel Processing, Lecture Notes in Computer Science, 5th International Euro-Par Conference, Aug. 31-Sep. 3, 1999 Proceedings, pp. 761-765, vol. 1685, Spring Berlin Heidelberg, Toulouse, France.

Pechanek, et al., "The ManArray Embedded Processor Architecture",Proceedings of the 26th Euromicro Conference, IEEE Computer Society, Sep. 5-7, 2000, pp. 348-355, vol. 1, Maastricht.

Czajkowski, et al., "Resource Management for Extensible Internet Servers", Proceedings of the 8th ACM SIGOPS European Workshop on Support for Composing Distributed Applications, Sep. 1998, pp. 33-39, ACM, Portugal.

Bridges, et al., "A CPU Utilization Limit for Massively Parallel MIMD Computers", Fourth Symposium on the Frontiers of Massively Parallel Computing, Oct. 19-21, 1992, pp. 83-92, IEEE, VA, US.

\* cited by examiner

PARALLEL SLICE PROCESSOR HAVING A RECIRCULATING LOAD-STORE QUEUE FOR FAST DEALLOCATION OF ISSUE QUEUE ENTRIES

The present Application is a Continuation of U.S. patent application Ser. No. 14/595,635, filed on Jan. 13, 2015 and claims priority thereto under 35 U.S.C. § 120. The disclosure of the above-referenced parent U.S. Patent Applications is incorporated herein by reference.

BACKGROUND OF THE INVENTION

1. Field of the Invention

The present invention is related to processing systems and processors, and more specifically to a pipelined processor core that includes execution slices having a recirculating load-store queue.

2. Description of Related Art

In present-day processor cores, pipelines are used to execute multiple hardware threads corresponding to multiple instruction streams, so that more efficient use of processor resources can be provided through resource sharing and by allowing execution to proceed even while one or more hardware threads are waiting on an event.

In existing processor cores, and in particular processor cores that are divided into multiple execution slices instructions are dispatched to the execution slice(s) and are retained in the issue queue until issued to an execution unit. Once an issue queue is full, additional operations cannot typically be dispatched to a slice. Since the issue queue contains not only operations, but operands and state/control information, issue queues are resource-intensive, requiring significant power and die area to implement.

It would therefore be desirable to provide a processor core having reduced issue queue requirements.

BRIEF SUMMARY OF THE INVENTION

The invention is embodied in a processor core, an execution unit circuit and a method. The method is a method of operation of the processor core, and the processor core is a processor core that includes the execution unit circuit.

The execution unit circuit includes an issue queue that receives a stream of instructions including functional operations and load-store operations, and multiple execution pipelines including a load-store pipeline that computes effective addresses of load operations and store operations, and issues the load operations and store operations to a cache unit. The execution unit circuit also includes a recirculation queue that stores entries corresponding to the load operations and the store operations and control logic for controlling the issue queue, the load-store pipeline and the recirculation queue. The control logic operates so that after the load-store pipeline has computed the effective address of a load operation or a store operation, the effective address of the load operation or the store operation is written to the recirculation queue and the load operation or the store operation is removed from the issue queue so that if one of the load operations or store operations are rejected by the cache unit, they are subsequently reissued to the cache unit from the recirculation queue.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to an execution slice for inclusion in a processor core that manages an internal issue queue by moving load/store (LS) operation entries to a recirculation queue once the effective address (EA) of the LS operation has been computed. The LS operations are issued to a cache unit and if they are rejected, the LS operations are subsequently re-issued from the recirculation queue rather than from the original issue queue entry. Since the recirculation queue entries only require storage for the EA for load operations and the EA and store value for store operations, power and area requirements are reduced for a given number of pending LS issue queue entries in the processor. In contrast, the issue queue entries are costly in terms of area and power due to the need to store operands, relative addresses and other fields such as conditional flags that are not needed for executing the LS operations once the EA is resolved.

Figure 1:
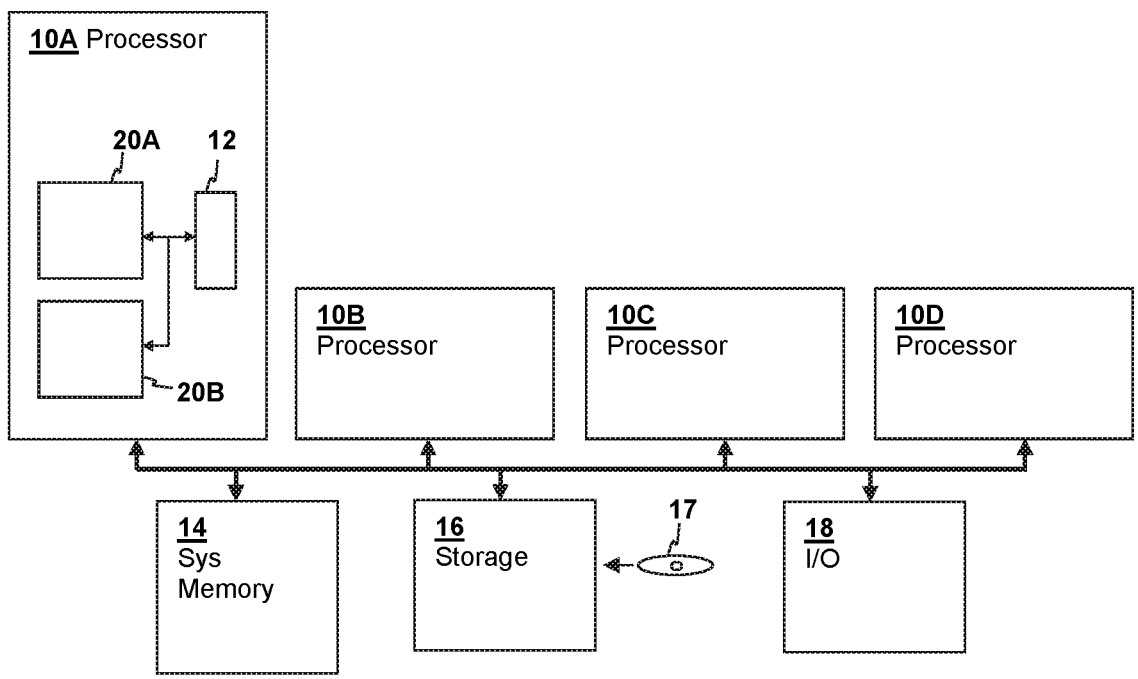
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each in conformity with an embodiment of the present invention. The depicted multi-processing system is illustrative, and a processing system in accordance with other embodiments of the present invention include uni-processor systems having multi-threaded cores. Processors 10A-10D are identical in structure and include cores 20A-20B and a local storage 12, which may be a cache level, or a level of internal system memory. Processors 10A-10B are coupled to a main system memory 14, a storage subsystem 16, which includes non-removable drives and optical drives, for reading media such as a CD-ROM 17 forming a computer program product and containing program instructions implementing generally, at least one operating system, associated applications programs, and optionally a hypervisor for controlling multiple operating systems' partitions for execution by processors 10A-10D. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
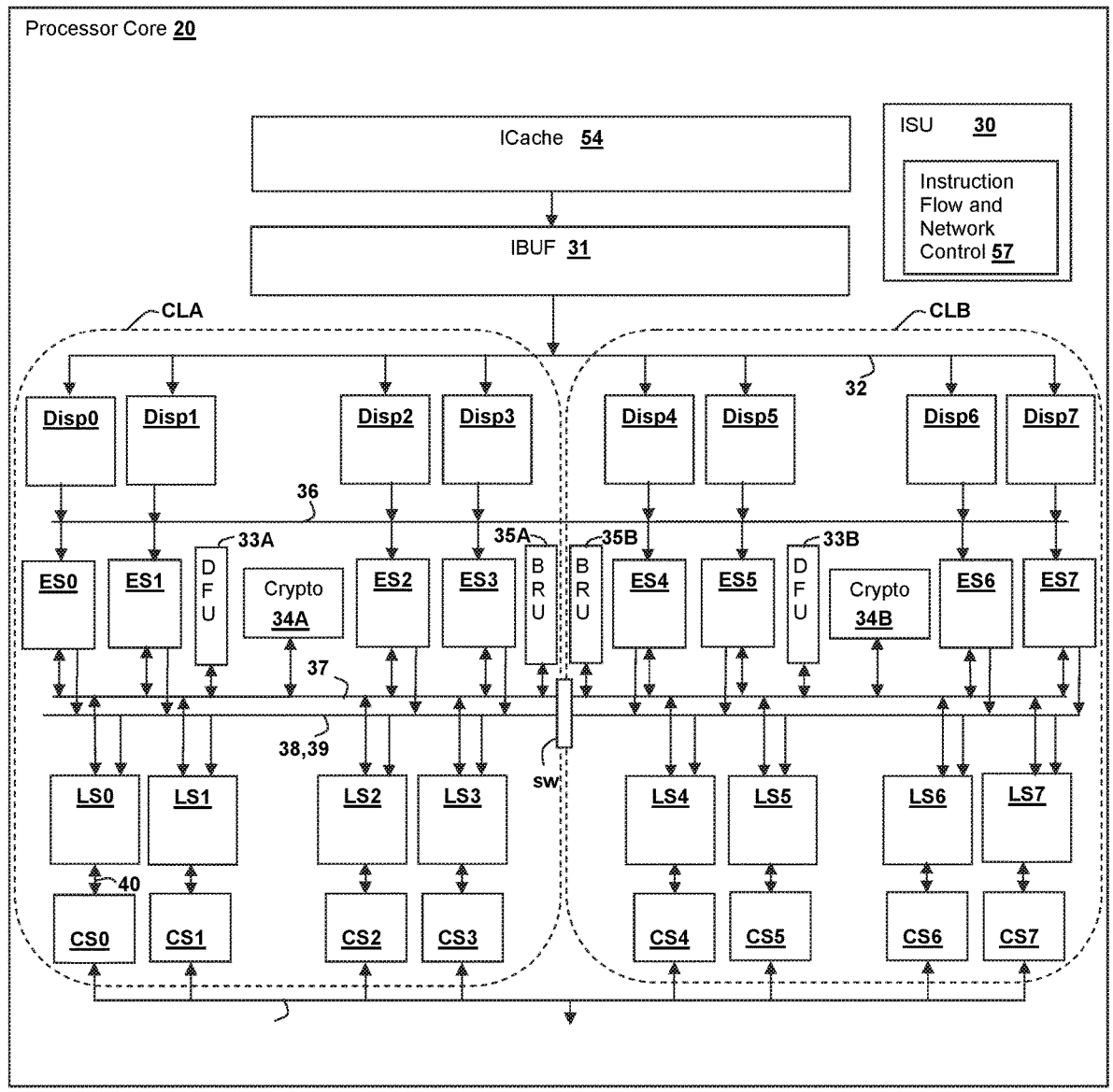
FIG. 2 is a block diagram illustrating details of a processor core 20 that can be used to implement processor cores 20A-20B of FIG. 1.

Referring now to FIG. 2, details of an exemplary processor core 20 that can be used to implement processor cores 20A-20B of FIG. 1 are illustrated. Processor core 20 includes an instruction cache (ICache) 54 and instruction buffer (IBUF) 31 that store multiple instruction streams fetched from cache or system memory and present the instruction stream(s) via a bus 32 to a plurality of dispatch queues Disp0-Disp7 within each of two clusters CLA and CLB. Control logic within processor core 20 controls the dispatch of instructions from dispatch queues Disp0-Disp7 to a plurality of instruction execution slices ES0-ES7 via a dispatch routing network 36 that permits instructions from any of dispatch queues Disp0-Disp7 to any of instruction execution slices ES0-ES7 in either of clusters CLA and CLB, although complete cross-point routing, i.e., routing from any dispatch queue to any slice is not a requirement of the invention. In certain configurations as described below, the dispatch of instructions from dispatch queues Disp0-Disp3 in cluster CLA will be restricted to execution slices ES0-ES3 in cluster CLA, and similarly the dispatch of instructions from dispatch queues Disp4-Disp7 in cluster CLB will be restricted to execution slices ES4-ES7. Instruction execution slices ES0-ES7 perform sequencing and execution of logical, mathematical and other operations as needed to perform the execution cycle portion of instruction cycles for instructions in the instruction streams, and may be identical general-purpose instruction execution slices ES0-ES7, or processor core 20 may include special-purpose execution slices ES0-ES7. Other special-purpose units such as cryptographic processors 34A-34B, decimal floating points units (DFU) 33A-33B and separate branch execution units (BRU) 35A-35B may also be included to free general-purpose execution slices ES0-ES7 for performing other tasks. Instruction execution slices ES0-ES7 may include multiple internal pipelines for executing multiple instructions and/or portions of instructions.

The load-store portion of the instruction execution cycle, (i.e., the operations performed to maintain cache consistency as opposed to internal register reads/writes), is performed by a plurality of load-store (LS) slices LS0-LS7, which manage load and store operations as between instruction execution slices ES0-ES7 and a cache memory formed by a plurality of cache slices CS0-CS7 which are partitions of a lowest-order cache memory. Cache slices CS0-CS3 are assigned to partition CLA and cache slices CS4-CS7 are assigned to partition CLB in the depicted embodiment and each of load-store slices LS0-LS7 manages access to a corresponding one of the cache slices CS0-CS7 via a corresponding one of dedicated memory buses 40. In other embodiments, there may be not be a fixed partitioning of the cache, and individual cache slices CS0-CS7 or sub-groups of the entire set of cache slices may be coupled to more than one of load-store slices LS0-LS7 by implementing memory buses 40 as a shared memory bus or buses. Load-store slices LS0-LS7 are coupled to instruction execution slices ES0-ES7 by a write-back (result) routing network 37 for returning result data from corresponding cache slices CS0-CS7, such as in response to load operations. Write-back routing network 37 also provides communications of write-back results between instruction execution slices ES0-ES7. Further details of the handling of load/store (LS) operations between instruction execution slices ES0-ES7, load-store slices LS0-LS7 and cache slices CS0-CS7 is described in further detail below with reference to FIGS. 4-6. An address generating (AGEN) bus 38 and a store data bus 39 provide communications for load and store operations to be communicated to load-store slices LS0-LS7. For example, AGEN bus 38 and store data bus 39 convey store operations that are eventually written to one of cache slices CS0-CS7 via one of memory buses 40 or to a location in a higher-ordered level of the memory hierarchy to which cache slices CS0-CS7 are coupled via an I/O bus 41, unless the store operation is flushed or invalidated. Load operations that miss one of cache slices CS0-CS7 after being issued to the particular cache slice CS0-CS7 by one of load-store slices LS0-LS7 are satisfied over I/O bus 41 by loading the requested value into the particular cache slice CS0-CS7 or directly through cache slice CS0-CS7 and memory bus 40 to the load-store slice LS0-LS7 that issued the request. In the depicted embodiment, any of load-store slices LS0-LS7 can be used to perform a load-store operation portion of an instruction for any of instruction execution slices ES0-ES7, but that is not a requirement of the invention. Further, in some embodiments, the determination of which of cache slices CS0-CS7 will perform a given load-store operation may be made based upon the operand address of the load-store operation together with the operand width and the assignment of the addressable byte of the cache to each of cache slices CS0-CS7.

Instruction execution slices ES0-ES7 may issue internal instructions concurrently to multiple pipelines, e.g., an instruction execution slice may simultaneously perform an execution operation and a load/store operation and/or may execute multiple arithmetic or logical operations using multiple internal pipelines. The internal pipelines may be identical, or may be of discrete types, such as floating-point, scalar, load/store, etc. Further, a given execution slice may have more than one port connection to write-back routing network 37, for example, a port connection may be dedicated to load-store connections to load-store slices LS0-LS7, or may provide the function of AGEN bus 38 and/or data bus 39, while another port may be used to communicate values to and from other slices, such as special-purposes slices, or other instruction execution slices. Write-back results are scheduled from the various internal pipelines of instruction execution slices ES0-ES7 to write-back port(s) that connect instruction execution slices ES0-ES7 to write-back routing network 37. Cache slices CS0-CS7 are coupled to a next higher-order level of cache or system memory via I/O bus 41 that may be integrated within, or external to, processor core 20. While the illustrated example shows a matching number of load-store slices LS0-LS7 and execution slices ES0-ES7, in practice, a different number of each type of slice can be provided according to resource needs for a particular implementation.

Within processor core 20, an instruction sequencer unit (ISU) 30 includes an instruction flow and network control block 57 that controls dispatch routing network 36, write-back routing network 37, AGEN bus 38 and store data bus 39. Network control block 57 also coordinates the operation of execution slices ES0-ES7 and load-store slices LS0-LS7 with the dispatch of instructions from dispatch queues Disp0-Disp7. In particular, instruction flow and network control block 57 selects between configurations of execution slices ES0-ES7 and load-store slices LS0-LS7 within processor core 20 according to one or more mode control signals that allocate the use of execution slices ES0-ES7 and load-store slices LS0-LS7 by a single thread in one or more single-threaded (ST) modes, and multiple threads in one or more multi-threaded (MT) modes, which may be simultaneous multi-threaded (SMT) modes. For example, in the configuration shown in FIG. 2, cluster CLA may be allocated to one or more hardware threads forming a first thread set in SMT mode so that dispatch queues Disp0-Disp3 only receive instructions of instruction streams for the first thread set, execution slices ES0-ES3 and load-store slices LS0-LS3 only perform operations for the first thread set and cache slices CS0-CS3 form a combined cache memory that only contains values accessed by the first thread set. Similarly, in such an operating mode, cluster CLB is allocated to a second hardware thread set and dispatch queues Disp4-Disp7 only receive instructions of instruction streams for the second thread set, execution slices ES4-ES7 and LS slices LS4-LS7 only perform operations for the second thread set and cache slices CS4-CS7 only contain values accessed by the second thread set. When communication is not required across clusters, write-back routing network 37 can be partitioned by disabling transceivers or switches sw connecting the portions of write-back routing network 37, cluster CLA and cluster CLB. Separating the portions of write-back routing network 37 provides greater throughput within each cluster and allows the portions of write-back routing network 37 to provide separate simultaneous routes for results from execution slices ES0-ES7 and LS slices LS0-LS7 for the same number of wires in write-back routing network 37. Thus, twice as many transactions can be supported on the divided write-back routing network 37 when switches sw are open. Other embodiments of the invention may sub-divide the sets of dispatch queues Disp0-Disp7, execution slices ES0-ES7, LS slices LS0-LS7 and cache slices CS0-CS7, such that a number of clusters are formed, each operating on a particular set of hardware threads. Similarly, the threads within a set may be further partitioned into subsets and assigned to particular ones of dispatch queues Disp0-Disp7, execution slices ES0-ES7, LS slices LS0-LS7 and cache slices CS0-CS7. However, the partitioning is not required to extend across all of the resources listed above. For example, clusters CLA and CLB might be assigned to two different hardware thread sets, and execution slices ES0-ES2 and LS slices LS0-LS1 assigned to a first subset of the first hardware thread set, while execution slice ES3 and LS slices LS2-LS3 are assigned to a second subject of the first hardware thread set, while cache slices CS0-CS3 are shared by all threads within the first hardware thread set. In a particular embodiment according to the above example, switches may be included to further partition write back routing network 37 between execution slices ES0-ES7 such that connections between sub-groups of execution slices ES0-ES7 that are assigned to different thread sets are isolated to increase the number of transactions that can be processed within each sub-group. The above is an example of the flexibility of resource assignment provided by the bus-coupled slice architecture depicted in FIG. 2, and is not a limitation as to any particular configurations that might be supported for mapping sets of threads or individual threads to resources such as dispatch queues Disp0-Disp7, execution slices ES0-ES7, LS slices LS0-LS7 and cache slices CS0-CS7.

Figure 3:
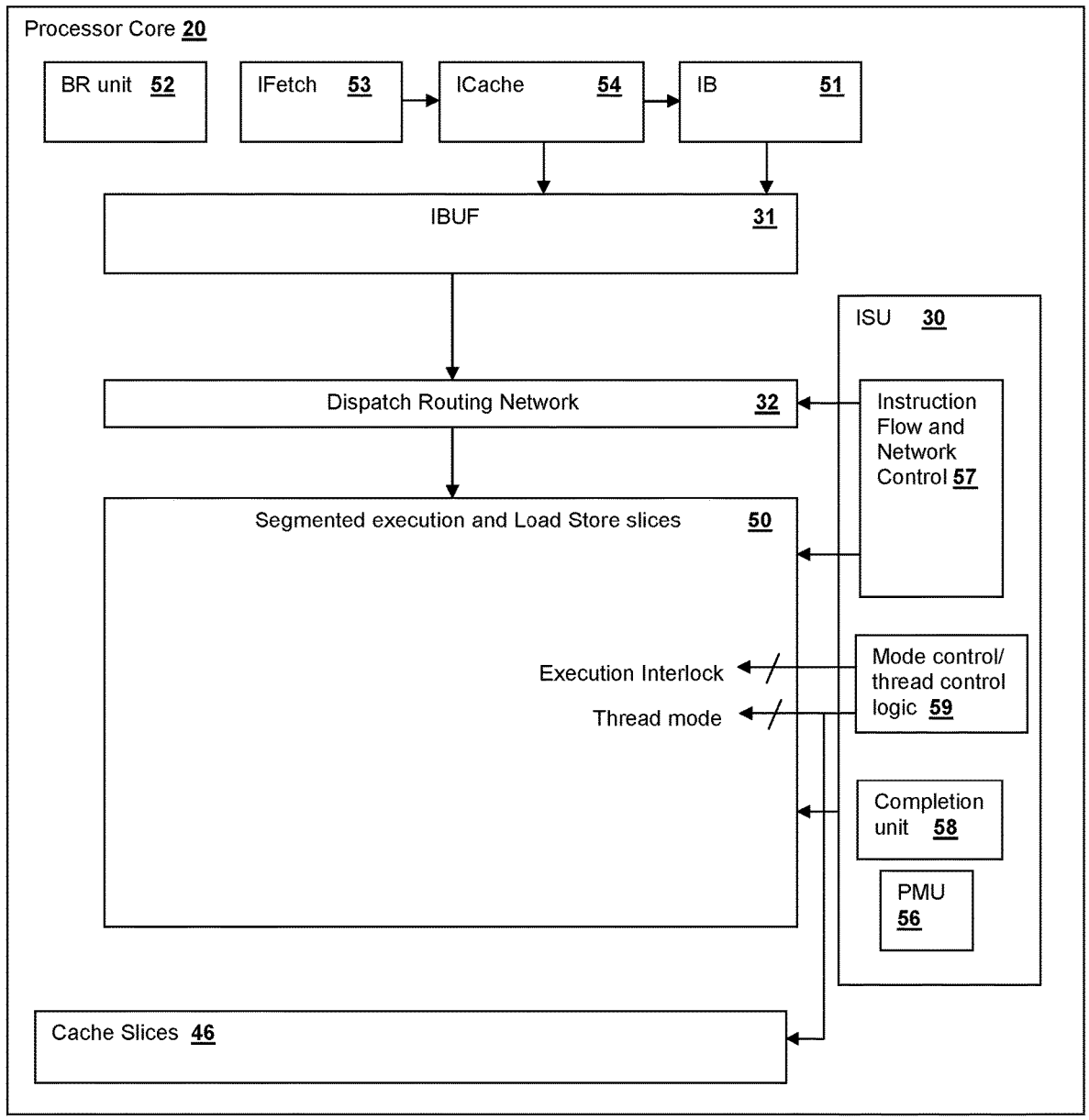
FIG. 3 is a block diagram illustrating details of processor core 20.

Referring now to FIG. 3, further details of processor core 20 are illustrated. Processor core 20 includes a branch execution unit 52 that evaluates branch instructions, and an instruction fetch unit (IFetch) 53 that controls the fetching of instructions including the fetching of instructions from ICache 54. Instruction sequencer unit (ISU) 30 controls the sequencing of instructions. An input instruction buffer (IB) 51 buffers instructions in order to map the instructions according to the execution slice resources allocated for the various threads and any super-slice configurations that are set. Another instruction buffer (IBUF) 31 is partitioned to maintain dispatch queues (Disp0-Disp7 of FIGS. 2-3) and dispatch routing network 32 couples IBUF 31 to the segmented execution and load-store slices 50, which are coupled to cache slices 46. Instruction flow and network control block 57 performs control of segmented execution and load-store slices 50, cache slices 46 and dispatch routing network 32 to configure the slices as illustrated in FIGS. 2-3, according to a mode control/thread control logic 59. An instruction completion unit 58 is also provided to track completion of instructions sequenced by ISU 30. ISU 30 also contains logic to control write-back operations by load-store slices LS0-LS7 within segmented execution and load-store slices 50. A power management unit 56 may also provide for energy conservation by reducing or increasing a number of active slices within segmented execution and cache slices 50. Although ISU 30 and instruction flow and network control block 57 are shown as a single unit, control of segmented execution within and between execution slices ES0-ES7 and load store slices LS0-LS7 may be partitioned among the slices such that each of execution slices ES0-ES7 and load store slices LS0-LS7 may control its own execution flow and sequencing while communicating with other slices.

Figure 4:
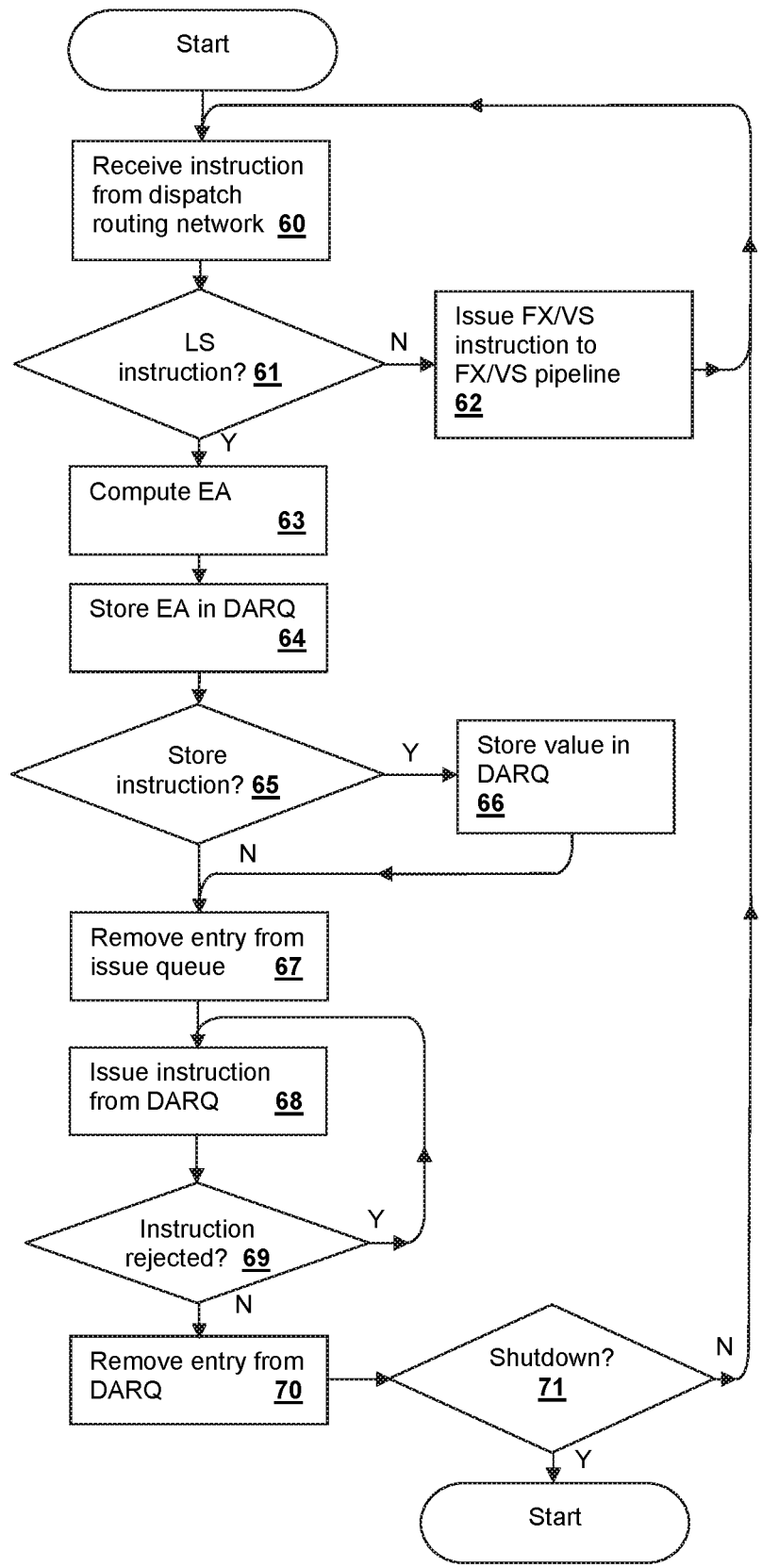
FIG. 4 is a flowchart illustrating a method of operating processor core 20.

Referring now to FIG. 4, a method of operating processor core 20 is shown according to an embodiment of the present invention. An instruction is received at one of execution slices ES0-ES7 from dispatch routing network 32 (step 60), and if the instruction is not an LS instruction, i.e., the instruction is a VS/FX instruction (decision 61), then FX/VS instruction is issued to the FX/VS pipeline(s) (step 62). If the instruction is an LS instruction (decision 61), the EA is computed (step 63) and stored in a recirculation queue (DARQ) (step 64). If the instruction is not a store instruction (decision 65) the entry is removed from the issued queue (step 67) after the instruction is stored in the DARQ. If the instruction is a store instruction (decision 65), then the store value is also stored in DARQ (step 66) and after both the store instruction EA and store value are stored in DARQ, the entry is removed from the issued queue (step 67) and the instruction is issued from DARQ (step 68). If the instruction is rejected (decision 69), then step 68 is repeated to subsequently reissue the rejected instruction. If the instruction is not rejected (decision 69), then the entry is removed from DARQ (step 70). Until the system is shut down (decision 71), the process of steps 60-70 is repeated. In alternative methods in accordance with other embodiments of the invention, step 67 may be performed only after an attempt to issue the instruction has been performed, and in another alternative, steps 64 and 66 might only be performed after the instruction has been rejected once, and other variations that still provide the advantage of the reduced storage requirements of an entry in the DARQ vs. and entry in the issue queue.

Figure 5:
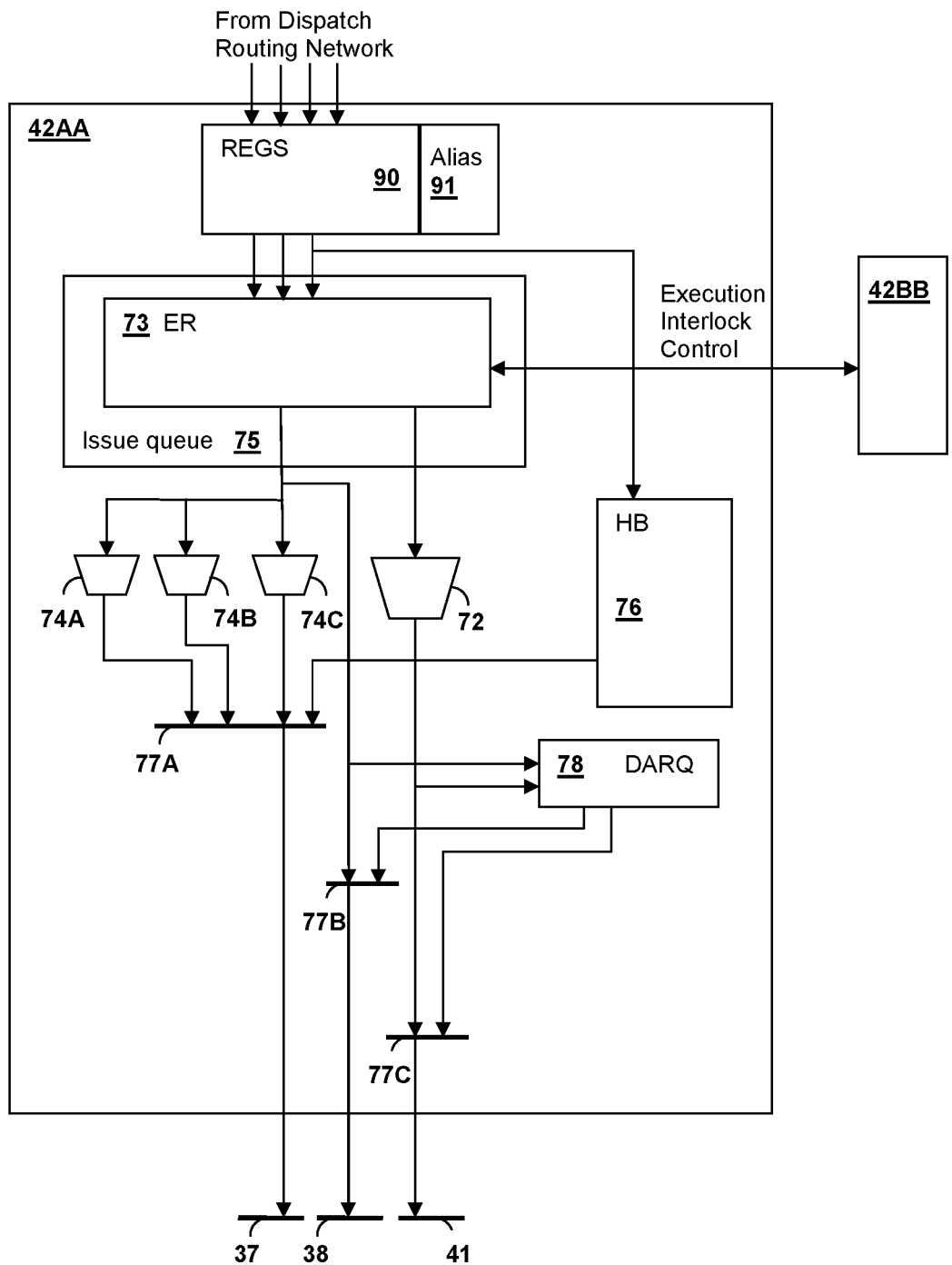
FIG. 5 is a block diagram illustrating details of an instruction execution slice 42AA that can be used to implement instruction execution slices ES0-ES7 of FIG. 2.

Referring now to FIG. 5, an example of an execution slice (ES) 42AA that can be used to implement instruction execution slices ES0-ES7 in FIGS. 2-3 is shown. Inputs from the dispatch queues are received via dispatch routing network 32 by a register array (REGS) 90 so that operands and the instructions can be queued in execution reservation stations (ER) 73 of issue queue 75. Register array 90 is architected to have independent register sets for independent instruction streams or where execution slice 42AA is joined in a super-slice executing multiple portions of an SIMD instruction, while dependent register sets that are clones in super-slices are architected for instances where the super-slice is executing non-SIMD instructions. An alias mapper (ALIAS) 91 maps the values in register array 90 to any external references, such as write-back values exchanged with other slices over write-back routing network 37. A history buffer HB 76 provides restore capability for register targets of instructions executed by ES 42AA. Registers may be copied or moved between super-slices using write-back routing network 37 in response to a mode control signal, so that the assignment of slices to a set of threads or the assignment of slices to operate in a joined manner to execute as a super-slice together with other execution slices can be reconfigured. Execution slice 42AA is illustrated alongside another execution slice 42BB to illustrate an execution interlock control that may be provided between pairs of execution slices within execution slices ES0-ES7 of FIGS. 2-3 to form a super-slice. The execution interlock control provides for coordination between execution slices 42AA and 42BB supporting execution of a single instruction stream, since otherwise execution slices ES0-ES7 independently manage execution of their corresponding instruction streams.

Execution slice 42AA includes multiple internal execution pipelines 74A-74C and 72 that support out-of-order and simultaneous execution of instructions for the instruction stream corresponding to execution slice 42AA. The instructions executed by execution pipelines 74A-74C and 72 may be internal instructions implementing portions of instructions received over dispatch routing network 32, or may be instructions received directly over dispatch routing network 32, i.e., the pipelining of the instructions may be supported by the instruction stream itself, or the decoding of instructions may be performed upstream of execution slice 42AA. Execution pipeline 72 is a load-store (LS) pipeline that executes LS instructions, i.e., computes effective addresses (EAs) from one or more operands. A recirculation queue (DARQ) 78 is controlled according to logic as illustrated above with reference to FIG. 4, so execution pipeline 72 does not have to compute the EA of an instruction stored in DARQ 78, since the entry in DARQ 78 is the EA, along with a store value for store operations. As described above, once an entry is present in DARQ 78, the corresponding entry can be removed from an issue queue 75. DARQ 78 can have a greater number of entries, freeing storage space in issue queue 75 for additional FX/VS operations, as well as other LS operations. FX/VS pipelines 74A-74C may differ in design and function, or some or all pipelines may be identical, depending on the types of instructions that will be executed by execution slice 42AA. For example, specific pipelines may be provided for address computation, scalar or vector operations, floating-point operations, etc. Multiplexers 77A-77C provide for routing of execution results to/from history buffer 76 and routing of write-back results to write-back routing network 37, I/O bus 41 and AGEN bus 38 that may be provided for routing specific data for sharing between slices or operations, or for load and store address and/or data sent to one or more of load-store slices LS0-LS7. Data, address and recirculation queue (DARQ) 78 holds execution results or partial results such as load/store addresses or store data that are not guaranteed to be accepted immediately by the next consuming load-store slice LS0-LS7 or execution slice ES0-ES7. The results or partial results stored in DARQ 78 may need to be sent in a future cycle, such as to one of load-store slices LS0-LS7, or to special execution units such as one of cryptographic processors 34A,34B. Data stored in DARQ 78 may then be multiplexed onto AGEN bus 38 or store data bus 39 by multiplexers 77B or 77C, respectively.

Figure 6:
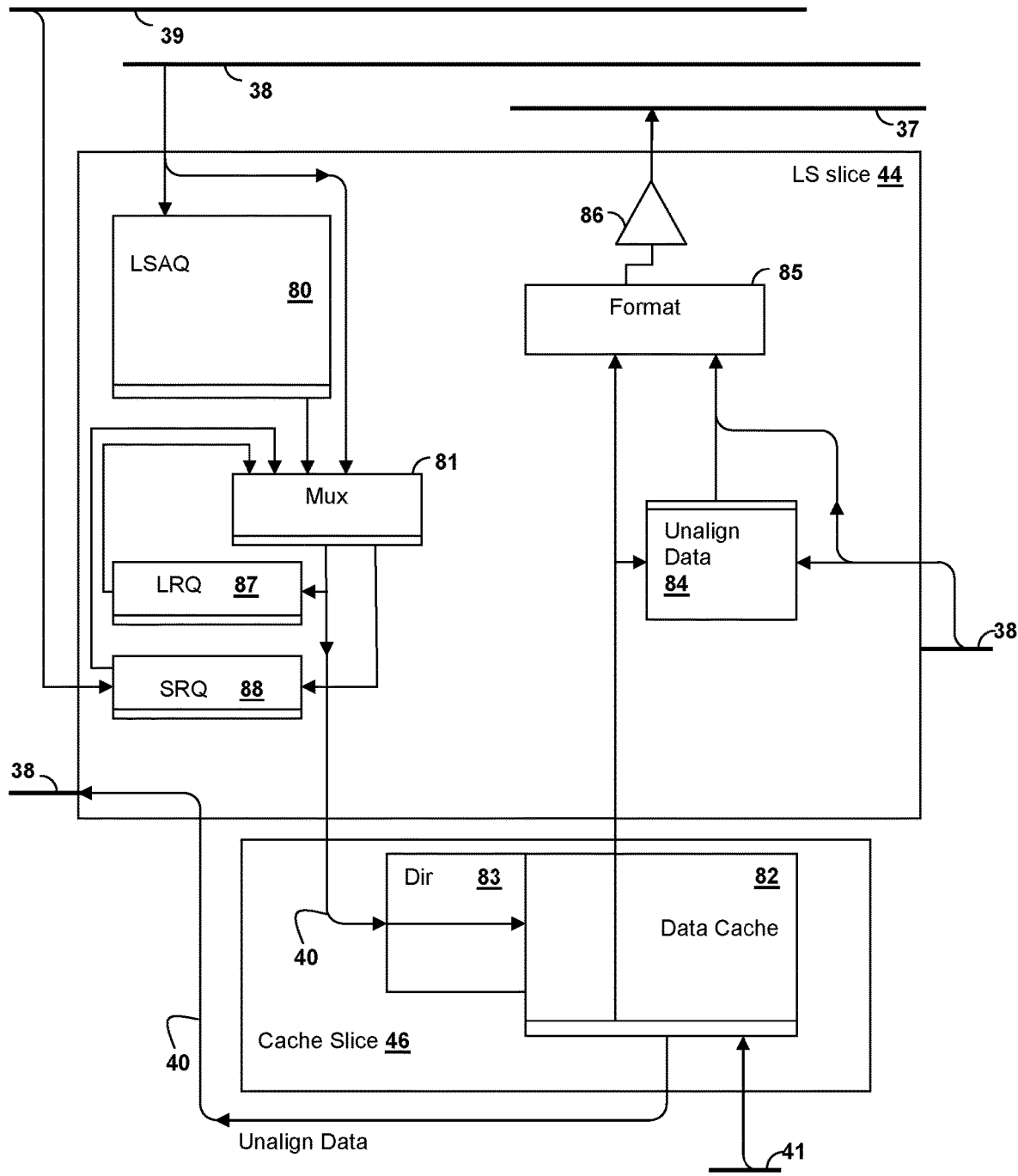
FIG. 6 is a block diagram illustrating details of a load store slice 44 and a cache slice 46 that can be used to implement load-store slices LS0-LS7 and cache slices CS0-CS7 of FIGS. 2-3.

Referring now to FIG. 6, an example of a load-store (LS) slice 44 that can be used to implement load-store slices LS0-LS7 in FIG. 2 is shown. A load/store access queue (LSAQ) 80 is coupled to AGEN bus 38, and the direct connection to AGEN bus 38 and LSAQ 80 is selected by a multiplexer 81 that provides an input to a cache directory 83 of a data cache 82 in cache slice 46 via memory bus 40. Logic within LSAQ 80 controls the accepting or rejecting of LS operations as described above, for example when a flag is set in directory 83 that will not permit modification of a corresponding value in data cache 82 until other operations are completed. The output of multiplexer 81 also provides an input to a load reorder queue (LRQ) 87 or store reorder queue (SRQ) 88 from either LSAQ 80 or from AGEN bus 38, or to other execution facilities within load-store slice 44 that are not shown. Load-store slice 44 may include one or more instances of a load-store unit that execute load-store operations and other related cache operations. To track execution of cache operations issued to LS slice 44, LRQ 87 and SRQ 88 contain entries for tracking the cache operations for sequential consistency and/or other attributes as required by the processor architecture. While LS slice 44 may be able to receive multiple operations per cycle from one or more of execution slices ES0-ES7 over AGEN bus 38, all of the accesses may not be concurrently executable in a given execution cycle due to limitations of LS slice 44. Under such conditions, LSAQ 80 stores entries corresponding to as yet un-executed operations. SRQ 88 receives data for store operations from store data bus 39, which are paired with operation information such as the computed store address. As operations execute, hazards may be encountered in the load-store pipe formed by LS slice 44 and cache slice 46, such as cache miss, address translation faults, cache read/write conflicts, missing data, or other faults which require the execution of such operations to be delayed or re-tried. In some embodiments, LRQ 87 and SRQ 88 are configured to re-issue the operations into the load-store pipeline for execution, providing operation independent of the control and operation of execution slices ES0-ES7. Such an arrangement frees resources in execution slices ES0-ES7 as soon as one or more of load-store slices LS0-LS7 has received the operations and/or data on which the resource de-allocation is conditioned. LSAQ 80 may free resources as soon as operations are executed or once entries for the operations and/or data have been stored in LRQ 87 or SRQ 88. Control logic within LS slice 44 communicates with DARQ 78 in the particular execution slice ES0-ES7 issuing the load/store operation(s) to coordinate the acceptance of operands, addresses and data. Connections to other load-store slices are provided by AGEN bus 38 and by write-back routing network 37, which is coupled to receive data from data cache 82 of cache slice 46 and to provide data to a data un-alignment block 84 of a another slice. A data formatting unit 85 couples cache slice 44 to write-back routing network 37 via a buffer 86, so that write-back results can be written through from one execution slice to the resources of another execution slice. Data cache 82 of cache slice 46 is also coupled to I/O routing network 41 for loading values from higher-order cache/system memory and for flushing or casting-out values from data cache 82. In the examples given in this disclosure, it is understood that the instructions dispatched to instruction execution slices ES0-ES7 may be full external instructions or portions of external instructions, i.e., decoded "internal instructions." Further, in a given cycle, the number of internal instructions dispatched to any of instruction execution slices ES0-ES7 may be greater than one and not every one of instruction execution slices ES0-ES7 will necessarily receive an internal instruction in a given cycle.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An execution unit circuit for a processor core, comprising:
   a plurality of internal execution pipelines, including a load-store pipeline for computing effective addresses of load operations and store operations and issuing the load operations and store operations to a cache unit over a bus that couples the load-store pipeline to the cache unit, and wherein the cache unit either rejects or accepts individual ones of the load operations and store operations from the load-store pipeline; and
   control logic for controlling an issue queue, the load-store pipeline and a recirculation queue so that after the load-store pipeline has computed the effective address of a load operation or a store operation, the effective address of the load operation or the store operation is written to the recirculation queue independent of whether the cache unit rejects or accepts the load operations or the store operation from the load store pipeline, and the load operation or the store operation is removed from the issue queue, wherein if a given one of the load operations or the store operations is rejected by the cache unit, and in response to the rejection of the given one of the load operations or the store operations, the given one of the load operations or the store operations is subsequently reissued to the cache unit from the recirculation queue over the bus that couples the load-store pipeline to the cache unit, wherein the control logic issues the load operations and store operations to the cache unit in the same processor cycle as a corresponding effective address of the corresponding load operations and the store operations are written to the recirculation queue.

2. The execution unit circuit of claim 1, wherein the recirculation queue stores only a corresponding effective address of the load operations and the store operations and for the store operations, further stores a corresponding value to be stored by the store operation.

3. The execution unit circuit of claim 2, wherein the control logic removes the load operations from the issue queue once a corresponding effective address is written to the recirculation queue and removes the store operations from the issue queue once the corresponding effective address and corresponding values to be stored by the store operations are written to the recirculation queue.

4. The execution unit circuit of claim 1, wherein the control logic removes the load operations from the issue queue once a corresponding effective address is written to the recirculation queue, and wherein the control logic issues the store operations and corresponding values to be stored by the store operations to the cache unit before removing the store data from the issue queue.

5. The execution unit circuit of claim 1, wherein the control logic issues the load operations and store operations to the cache unit in the same processor cycle as a corresponding effective address of the corresponding load operations and the store operations are written to the recirculation queue.

6. The execution unit circuit of claim 1, wherein the cache unit is implemented as a plurality of cache slices to which the load operations and the store operations are routed via the bus, and wherein the reissue of the given one of the load operations or the store operations is directed to a different cache slice than another cache slice that has previously rejected the given one of the load operations or the store operations.

7. The execution unit circuit of claim 1, wherein the control logic halts the issue of the given one of the load instructions or the store instructions from the issue queue when the recirculation queue is full.

8. A processor core, comprising:
   a plurality of dispatch queues for receiving instructions of a corresponding plurality of instruction streams;
   a dispatch routing network for routing the output of the dispatch queues to the instruction execution slices;
   a dispatch control logic that dispatches the instructions of the plurality of instruction streams via the dispatch routing network to issue queues of the plurality of parallel instruction execution slices; and
   a plurality of parallel instruction execution slices for executing the plurality of instruction streams in parallel, wherein the instruction execution slices comprise an issue queue for receiving a stream of instructions including functional operations and load-store operations, a plurality of internal execution pipelines, including a load-store pipeline for computing effective addresses of load operations and store operations and issuing the load operations and store operations to a cache unit over a bus that couples the load-store pipeline to the cache unit and wherein the cache unit either rejects or accepts individual ones of the load operations and store operations from the load-store pipeline, a recirculation queue coupled to the load-store pipeline for storing entries corresponding to the load operations and the store operations, and queue control logic for controlling the issue queue, the load-store pipeline and the recirculation queue so that after the load-store pipeline has computed the effective address of a load operation or a store operation, the effective address of the load operation or the store operation is written to the recirculation queue independent of whether the cache unit rejects or accepts the load operations or the store operation from the load store pipeline, and the load operation or the store operation is removed from the issue queue, wherein if a given one of the load operations or the store operations is rejected by the cache unit, and in response to the rejection of the given load operation or store operation, the given one of the load operations or the store operations is subsequently reissued to the cache unit from the recirculation queue over the bus that couples the load-store pipeline to the cache unit, wherein the queue control logic removes the load operations from the issue queue once the effective address is written to the recirculation queue, and wherein the queue control logic issues the store operations and values to be stored by the store operations to the cache unit before removing the store data from the issue queue.

9. The processor core of claim 8, wherein the recirculation queue stores only the effective addresses of the load operations and the store operations and for the store operations, further stores the values to be stored by the store operations.

10. The processor core of claim 9, wherein the queue control logic removes the load operations from the issue queue once the corresponding effective address is written to the recirculation queue and removes store operations from the issue queue once the corresponding effective address and the corresponding values to be stored by the store operations are written to the recirculation queue.

11. The processor core of claim 8, wherein the queue control logic removes the load operations from the issue queue once the effective address is written to the recirculation queue, and wherein the queue control logic issues the store operations and values to be stored by the store operations to the cache unit before removing the store data from the issue queue.

12. The processor core of claim 8, wherein the processor core further comprises a plurality of cache slices to which the load and the store operations are routed via the bus and that implements the cache unit, and wherein the reissue of the given load operation or store operation is directed to a different cache slice than another cache slice that has previously rejected the rejected load operation or store operation.

13. The processor core of claim 8, wherein the queue control logic halts the issue of the given one of the load instructions or the store instructions from the issue queue when the recirculation queue is full.

14. A method of executing program instructions within a processor core, the method comprising:
receiving a stream of instructions including functional operations and load-store operations at an issue queue;
by a load-store pipeline within the processor core, computing effective addresses of the load operations and the store operations of the load-store operations;
issuing the load operations and store operations from the load-store pipeline to a cache unit over a bus that couples the cache unit to the load-store pipeline wherein the issuing of the load operations and the store operations to the cache unit issues the load and store operations to the cache unit in the same processor cycle as the storing entries stores a corresponding effective address of the load or the store operation in the recirculation queue;
the cache unit either rejecting or accepting individual ones of the load operations and store operations from the load-store pipeline;
storing entries corresponding to the load operations and the store operations at a recirculation queue coupled to the load-store pipeline, wherein the issuing of the load operations and the store operations to the cache unit issues the load and store operations to the cache unit in the same processor cycle as the storing entries stores corresponding entries containing the effective address of the load or the store operation in the recirculation queue independent of whether the cache unit rejects or accepts the load operations or the store operation from the load store pipeline;
responsive to storing the entries corresponding to the load operations at the recirculation queue, removing the load operations and store operations from the issue queue; and
responsive to the load-store pipeline receiving an indication that the cache unit has rejected a given one of the load operations or one of the store operations in response to the issuing of the given one of the load operations or store operations, subsequently reissuing the given one of the load operations or the store operations to the cache unit over the bus that couples the cache unit to the load-store pipeline from the recirculation queue.

15. The method of claim 14, wherein the storing entries stores only a corresponding effective address of the load operations and the store operations and for the store operations, further stores a corresponding value to be stored by the store operation.

16. The method of claim 15, further comprising:
removing the load operations from the issue queue once a corresponding effective address is written to the recirculation queue; and
removing store operations from the issue queue once the corresponding effective address and corresponding values to be stored by the store operations are written to the recirculation queue.

17. The method of claim 14, further comprising:
removing the load operations from the issue queue once a corresponding effective address is written to the recirculation queue; and
issuing the store operations and corresponding values to be stored by the store operations to the cache unit before removing the store data from the issue queue.

18. The method of claim 14, wherein the cache unit is implemented as a plurality of cache slices to which the load and the store operations are routed via the bus, and wherein the reissuing of the given one of the load operations or the store operations is directed to a different cache slice than another cache slice that has previously rejected the given one of the load operations or the store operations.

19. The method of claim 14, further comprising halting the issue of the given one of the load instructions or the store instructions from the issue queue when the recirculation queue is full.

* * * * *